July 26, 1932.  L. D. JONES  1,869,152

DYNAMO ELECTRIC MACHINE

Filed Dec. 28, 1929

Inventor:
Laurence D. Jones,
by Charles V. Tullar
His Attorney.

Patented July 26, 1932

1,869,152

UNITED STATES PATENT OFFICE

LAURENCE D. JONES, OF SCHENECTADY, NEW YORK, ASSIGNOR TO GENERAL ELECTRIC COMPANY, A CORPORATION OF NEW YORK

DYNAMO ELECTRIC MACHINE

Application filed December 28, 1929. Serial No. 417,210.

My invention relates to dynamo electric machines of the type having a driving pulley or drum directly mounted on the rotor of the machine.

In constructing dynamo electric machines of this kind it has been the practice, heretofore, to mount the rotor core structure of the machine on a spider and key, or otherwise secure the same to the shaft of the machine, and then arrange the driving member on the shaft of the machine. This type of construction has required a large diameter shaft for the machine to withstand the bending stresses to which the shaft was subjected on account of the forces applied to the driving member. Large diameter shafts of the machines have been required particularly in elevator motors in which the cable drum has been mounted directly on the shaft due to the fact that the tension in the cable which was wound on the drum subjected the rotor shaft to very severe bending stresses. These large shafts have been very costly to manufacture and greatly interfered with adequate ventilation of the machine during its operation.

The object of my invention is to provide a dynamo electric machine construction in which the rotor core structure and the driving member are mounted on the shaft of the rotor in such manner as to provide a simple and inexpensive construction, and one which affords adequate ventilation of the machine.

I accomplish this by providing a dynamo electric machine with a shaft having axially extending webs thereon, a core structure mounted on the webs, and a driving member mounted on the webs adjacent the core structure. By this construction I am enabled to use a shaft of small diameter as the same is greatly reinforced by the webs thereon, and the space between the webs, the core structure and the shaft affords ample space for ventilating the rotor of the machine. Moreover, arranging the driving member and core structure of the rotor on the webs extending from the shaft in this manner provides a simple and direct mechanical connection between the core structure and the driving member by which the torque of the machine can be transmitted to the driving member.

My invention will be more fully set forth in the following description referring to the accompanying drawing, and the features of novelty which characterize my invention will be pointed out with particularity in the claims annexed to and forming a part of this specification.

Figure 1:
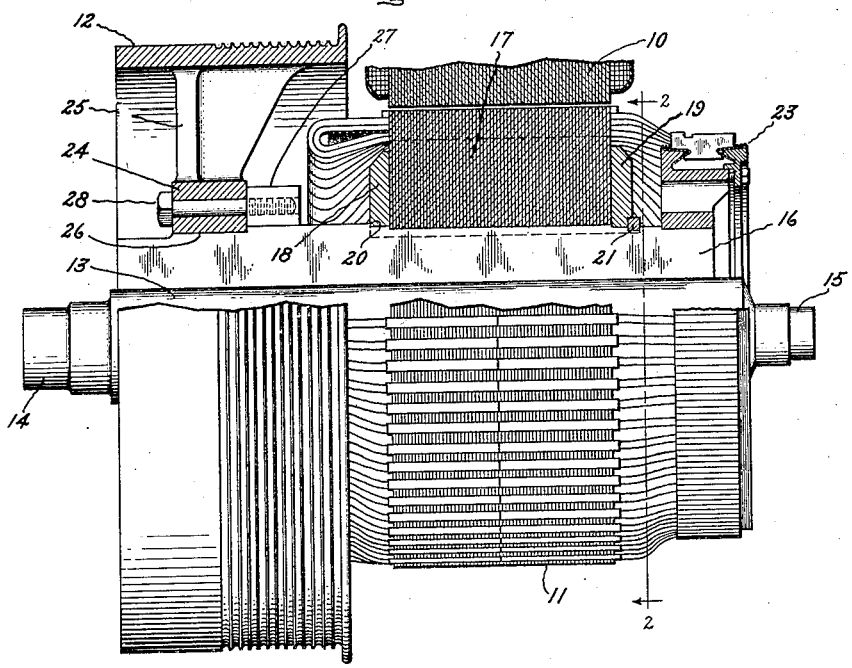
Figure 2:
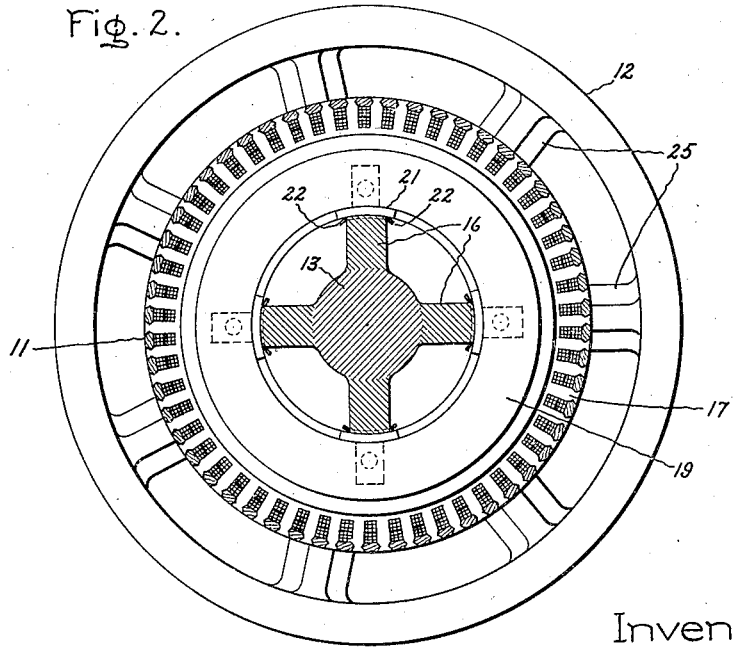

Fig. 1 is a fragmentary view of a dynamo electric machine embodying my invention partially in longitudinal section, and Fig. 2 is a section approximately on the line 2—2 of Fig. 1.

Referring to the drawing I have shown my invention in connection with a direct current elevator motor having a field structure 10 and an armature 11, which is mechanically connected to a cable drum 12 of the usual construction. The armature shaft 13 of the motor is provided with journals 14 and 15 for supporting the armature and the cable drum in the bearings of the machine. In accordance with my invention axially extending webs 16 are secured to the shaft 13. The webs are welded to the shaft although they may be secured thereto in any other convenient manner. The laminations of the core 17 of the armature are notched to fit a key on one of the webs 16 and are retained in place by clamping covers 18 and 19, arranged between a shoulder 20 on the webs and arcuate keys 21 having downwardly bent end-portions 22 for locking them in place. The commutator 23 of the armature is connected to the armature winding in the usual manner and is also mounted on the webs 16. The cable drum 12 is provided with an annular hub 24 connected to the cable drum by spokes 25. The webs 16 are finished as indicated at 26 to fit the inside of the hub 24 and are provided with projections 27 to which the cable drum is secured by bolts 28.

It will be seen from the foregoing that I have provided an elevator motor construction in which a small diameter shaft can be employed because it is greatly reinforced against bending stresses by the axially extending webs, and that I have simplified the construction of the machine and provided for adequate ventilation of the armature thereof as the axially extending webs on the shaft avoid the necessity of using a separate armature spider mounted on the motor shaft and afford adequate passages for the circulation of cooling air through the machine.

Although I have shown my invention in connection with an elevator motor, I do not desire to be limited thereto, and I intend in the appended claims to cover all modifications which do not depart from the spirit and scope of my invention.

What I claim as new and desire to secure by Letters Patent of the United States, is:—

1. A dynamo-electric machine including a shaft, axially extending webs on said shaft, a core structure mounted on said webs, and a driving member mounted on said webs adjacent said core structure.

2. A dynamo-electric machine including a shaft, axially extending webs on said shaft, a core structure directly engaging said webs, means carried by said webs for clamping said core structure together, and a driving member mounted on said webs adjacent said core structure.

3. A dynamo-electric machine including a shaft, axially extending webs on said shaft, a core structure directly engaging said webs, means carried by said webs for clamping said core structure together, projections on said webs, and a driving member attached to said projections.

4. A dynamo-electric machine including a shaft, axially extending webs on said shaft, a core structure and a commutator mounted on said webs, and a driving member mounted on said webs adjacent said core structure.

5. A dynamo-electric machine including a shaft, axially extending webs on said shaft, a shoulder on said webs, a core structure on said webs, means for clamping said core structure against said shoulder, and a driving member on said webs adjacent said core structure.

6. A dynamo-electric machine including a shaft, axially extending webs on said shaft, a shoulder on said webs, a core structure on said webs, means for clamping said core structure against said shoulder, a commutator carried by said webs, projections on said webs, and a driving member secured to said projections.

In witness whereof, I have hereto set my hand this 27th day of December, 1929.

LAURENCE D. JONES.